(12) United States Patent  
Costa

(10) Patent No.: US 8,891,251 B2  
(45) Date of Patent: Nov. 18, 2014

(54) METHOD AND APPARATUS FOR ACHIEVING ZERO AC-DRAW MODE FOR A DEVICE

(75) Inventor: Paul J. Costa, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1079 days.

(21) Appl. No.: 12/755,676

(22) Filed: Apr. 7, 2010

(65) Prior Publication Data

US 2011/0249471 A1    Oct. 13, 2011

(51) Int. Cl.
*H02M 7/02* (2006.01)
*H02J 9/00* (2006.01)
*H01H 47/22* (2006.01)
*G06F 1/32* (2006.01)

(52) U.S. Cl.
CPC ............... *G06F 1/32* (2013.01); *G06F 1/3203* (2013.01); *H02J 9/005* (2013.01); *H01H 47/22* (2013.01)
USPC ......................................................... 363/13

(58) Field of Classification Search
USPC ................. 307/116–116, 125–126, 130, 131; 363/13
See application file for complete search history.

(56) References Cited

U.S. PATENT DOCUMENTS

| | | | |
|---|---|---|---|
| 4,356,476 A * | 10/1982 | Healey et al. | 340/522 |
| 5,051,607 A | 9/1991 | Dalton | |
| 5,423,045 A | 6/1995 | Kannan et al. | |
| 5,486,726 A | 1/1996 | Kim et al. | |
| 5,508,878 A | 4/1996 | Pecore | |
| 5,798,951 A | 8/1998 | Cho et al. | |
| 5,862,394 A | 1/1999 | Watts et al. | |
| 6,070,247 A | 5/2000 | Wallace et al. | |
| 6,586,849 B2 | 7/2003 | Tarr | |
| 7,250,694 B2 | 7/2007 | Lin | |
| 8,164,932 B2 * | 4/2012 | Sims et al. | 363/69 |
| 8,421,275 B2 * | 4/2013 | Sauter et al. | 307/125 |
| 2008/0179964 A1 | 7/2008 | Chiu et al. | |
| 2009/0287946 A1 | 11/2009 | Lin | |
| 2012/0017103 A1 * | 1/2012 | Abraham et al. | 713/320 |
| 2013/0088097 A1 * | 4/2013 | Kim | 307/140 |

FOREIGN PATENT DOCUMENTS

| | | | |
|---|---|---|---|
| CN | WO 2009/149655 | * | 12/2009 |
| EP | 0962950 A2 | | 12/1999 |
| GB | 2210217 | * | 6/1989 |
| GB | 2210217 A | | 6/1989 |
| WO | 0113492 A1 | | 2/2001 |
| WO | 2009149655 A1 | | 12/2009 |
| WO | WO-2011/126565 A2 | | 10/2011 |

* cited by examiner

*Primary Examiner* — Carlos Amaya
*Assistant Examiner* — Daniel Kessie
(74) *Attorney, Agent, or Firm* — Park, Vaughan, Fleming & Dowler LLP

(57) ABSTRACT

The disclosure describes a processing system with a soft power switch assembly configured to include a zero-power off mode that would allow an off state with no power drain by the device while maintaining all other soft power off mode capabilities, including low power modes, (e.g., sleep, hibernation modes). The processing system can be restored from the zero-power off mode using the same actuation mechanism used when switching from a power on mode to a soft power off mode.

7 Claims, 4 Drawing Sheets

METHOD AND APPARATUS FOR ACHIEVING ZERO AC-DRAW MODE FOR A DEVICE

BACKGROUND

The present disclosure relates generally to methods and apparatus for supplying AC power to processor-based systems, and more particularly, relates to arrangements including a "soft" power switch while facilitating a zero-power off mode for the system.

Mechanical or "hard" power switches are well known for various types of products, and achieve a true zero-power draw when in an "off" state, as there is a mechanical breaking of the circuit. However, such switches are limited, as they require mechanical interaction (typically from a user) to restore power. Additionally, due to the need for mechanical interaction, they may require physical placements and/or actuation forces that are less than optimal in many applications. As a result, many processor-based systems, such as mobile phones, digital media players, and computers of all types (desktops, laptops, tablets, etc.) and the like, often use "soft" power switches, which typically use a momentary contact to send a signal to the processor-based system, that will then turn the system on or off under software control of a processor. Thus, these "soft" power switches generally have at least one "power" button to change the mode of the system between at least two (and potentially more) power states, a soft power-off state (G2) and a power-on state (G0). Typically, however, conventional soft power switching requires that the soft-power-off state continue to provide power to a select few components. This is necessary to allow the switch to "wake" or "turn on" the system from the soft power off state. Thus, these systems do not achieve a true zero-power draw, even when they are seen by the user as being completely shut down.

An advantage of soft power systems is that the power button can be used to trigger other modes of operation, such as entering or leaving a sleep mode (e.g., sleeping, G1). In addition to a general on/off power button, some systems includes a separate "hard" power switch to disconnect the alternating current (AC) mains power source to bring the system to a zero-power off mode, and eliminating any power draw by the system. However, separate power mode buttons again require dedicated hardware and space for implementation. Thus, it would be desirable to implement a soft power switching system that would allow a true "off" state with no power drain by the device.

SUMMARY

The disclosure describes a processing system with a soft power switch assembly configured to include a zero-power off mode with no power drain by the device, while maintaining all other soft power off mode capabilities, including sleep modes. The processing system can be restored from the zero-power "off" mode through use of the same actuation mechanism for switching from a "power on" mode to a soft "power off" mode. In some examples, the assembly will include a first switch which may be maintained in a closed position in response to a momentary physical actuation movement, but which can be released in response to an electrical signal. In many examples, the assembly will include a second switch that may be used to provide user inputs to the processing system, including an input to transition the system to a zero-power "off" mode. In some cases, where multiple switches are present, both will be physically actuable through a single user contact mechanism.

DETAILED DESCRIPTION

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the invention. Many other embodiments may be utilized for practicing the inventive subject matter than the illustrative examples discussed herein, and many structural and operational changes in addition to the alternatives specifically discussed herein may be made without departing from the scope of the inventive subject matter.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

For the purposes of this specification, "computing device," "computing system," "processor-based system" or "processing system" includes a system that uses one or more processors, microcontrollers and/or digital signal processors and that has the capability of running a "program." As used herein, the term "program" refers to a set of executable machine code instructions, and as used herein, includes user-level applications as well as system-directed applications or daemons, including operating system and driver applications. Processing systems can include communication and electronic devices, such as mobile phones (cellular or digital), music and multi-media players, electronic reading devices, and Personal Digital Assistants (PDA); as well as computers, or "computing devices" of all forms (desktops, laptops, servers, palmtops, workstations, tablet devices, notebooks, netbooks, etc.).

Figure 1A:
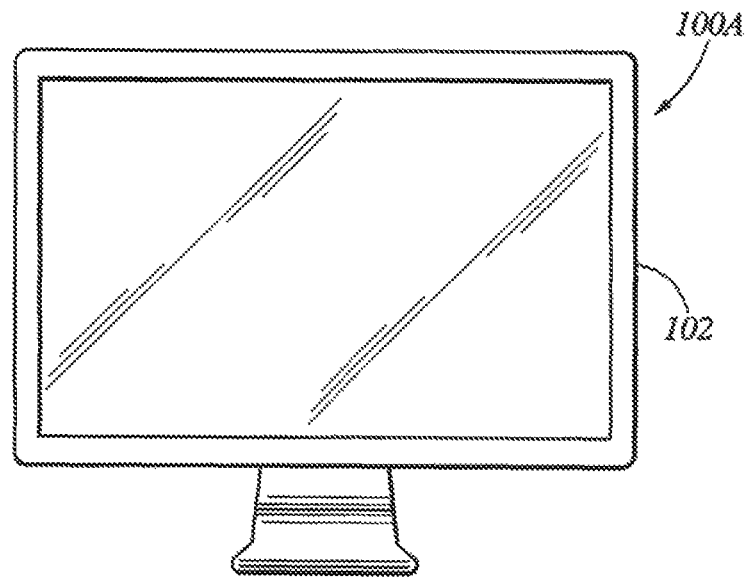
FIGS. 1A-B depict an example processing system having an actuation mechanism as may be used with a switching assembly to enable a zero-power off mode for a system.
Figure 1B:
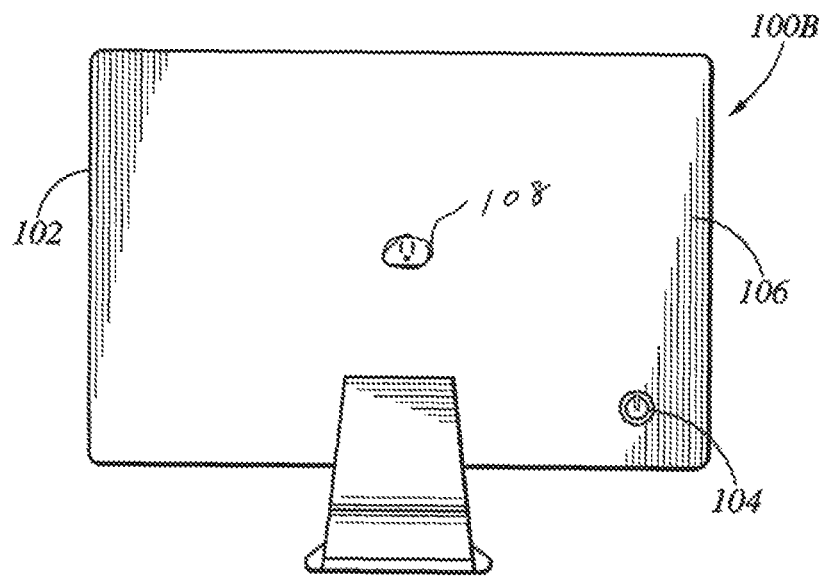

FIGS. 1A-B depict an example processing system 102 having an actuation mechanism 104 (e.g., a mechanically operable push-button) as may be used with a power switch assembly to enable a zero-power "off" mode. As can be seen in the Figure, processing system 102 is in the example form of a desktop computer with the actuation mechanism 104 located on its backside 106. Processing system also includes an AC power connector 108 facilitating couple through a power cord to an AC power supply. In this example, depressing the actuation mechanism 104 provides an actuation movement to one or more momentary mechanical switches of the power switch assembly, which facilitates changing the state of processing system 102, including changing states from a true zero-power "off" mode to a "power on" mode.

In addition to its use for achieving a true zero-power off mode, the actuation mechanism 104 can also be used in combination with the power switch assembly to facilitate other power modes, such as, switching between a power-on mode and soft-power-off mode, and/or a "sleep" or "hibernation" mode. As an example, when the actuation mechanism 104 is depressed for an extended period of time (e.g., 5 or more seconds), a power management controller may recognize the sustained hold as a command to place the system 102 in a soft-power off mode. Other forms of actuation mechanisms known to those skilled in the art may be readily substituted for the mechanically operable actuation mechanism 104 described above. For example, an optical switch or a toggle switch may be substituted for the mechanically operable actuation mechanism. For convenience, this description will describe structures and operations in reference to a mechanically operable push button mechanism.

Figure 2A:
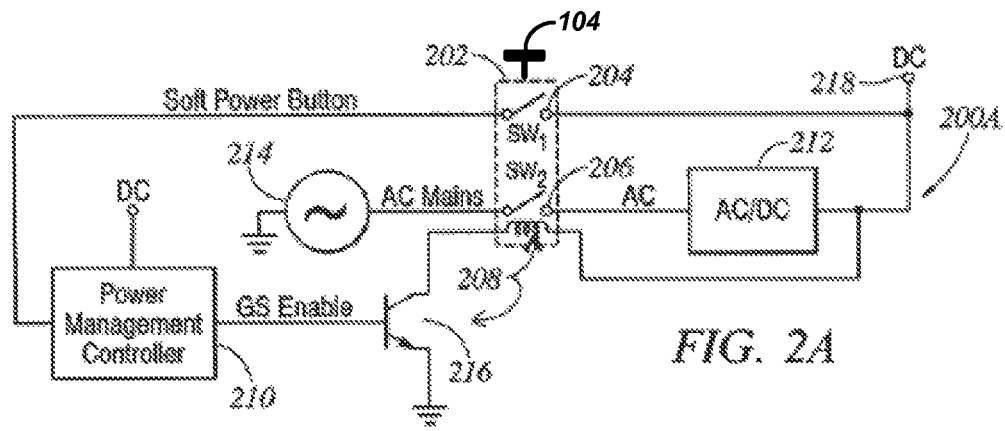
FIGS. 2A-B depict an example circuit configuration and corresponding timing diagram of a soft power switch assembly facilitating a zero-power off mode.
Figure 2B:
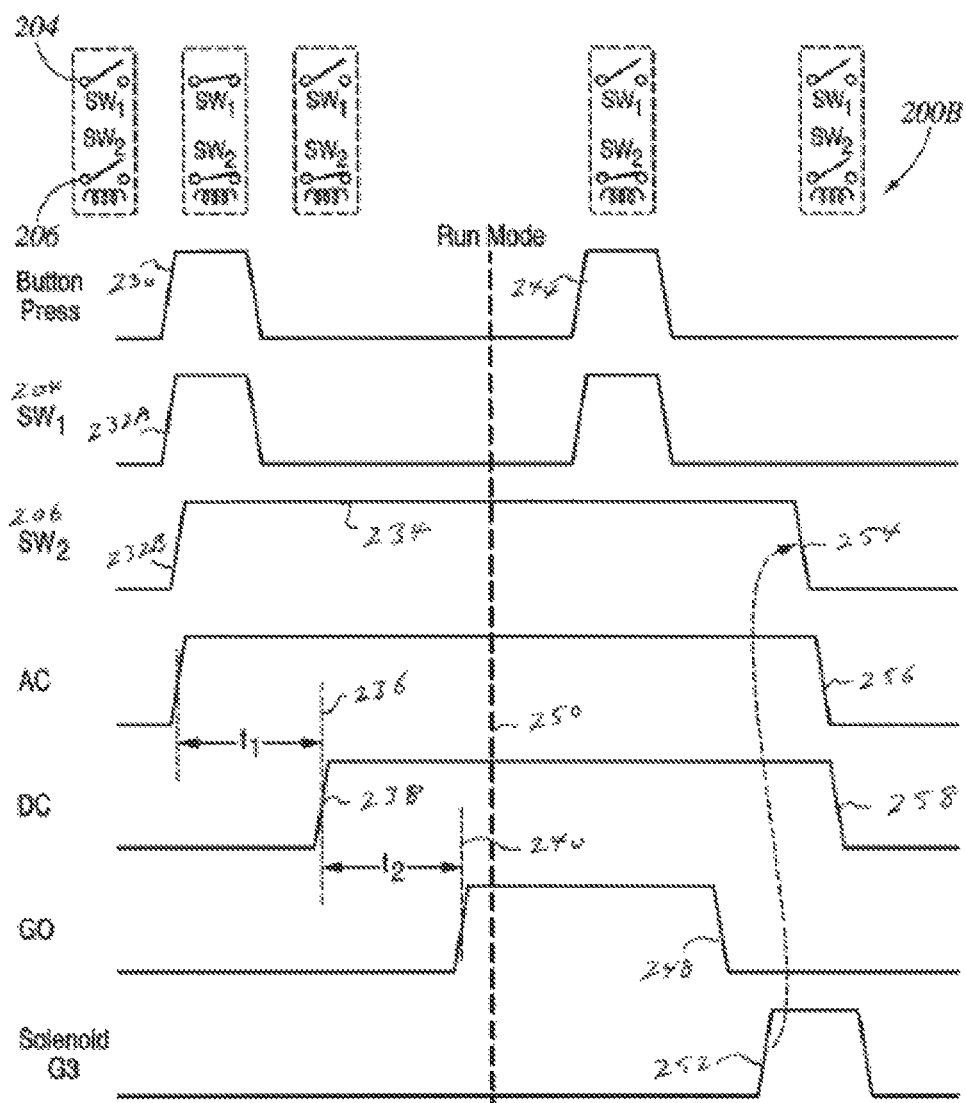

FIGS. 2A-B depict, in FIG. 2A, an example circuit configuration 200A for facilitating a zero-power off mode of a processing system operable from an alternating current (AC) power source 214 to which the system is coupled; and in FIG. 2B, a corresponding timing diagram 200B. Circuit 200A includes a power switch assembly 202, electrically between an AC power input and an AC/DC converter 212 to provide direct current (DC) at node 218. Circuit configuration 200A also includes a power management controller 210 configured to manage the power modes of the processing system. Power management controller will preferably include and be implemented through use of one or more dedicated processors; although the functionality could also be implemented through one or more application specific ICs (ASICs) or through use of the main system processor. The power switch assembly 202 is machine-controllable to enter an off state that eliminates essentially all current drain by the processing system from AC power supply 214.

In the depicted example, the power switch assembly 202 is a double pole, single throw assembly including first and second momentary mechanical switches 204 and 206. Both of switches 204 (SW1) and 206 (SW2) are simultaneously actuated by movement of an actuation mechanism 104 (e.g., a mechanically depressible push button). Additionally, second momentary mechanical switch 206 is also responsive to a latch control assembly 208 placed proximate the switch. The latch control assembly 208 can be any of a variety of mechanisms configured to both releasably retain the switch in the closed position and allow release of the switch in response to an electrical signal. Although these two functions are described as being performed by a single "assembly," it will be apparent to those skilled in the art, that the functions can be performed by entirely separate and essentially unrelated mechanisms. In the depicted example, the retention function of latch control assembly 208 is performed by a permanent magnet that functionally engages a portion, of the switch mechanism to retain switch 208 in the closed position, when actuated. Latching assembly 208 also includes an electrically controllable mechanism, such as a solenoid, to release the latched switch 206, as discussed below.

The first switch 204 is coupled between the DC power supply 208 and the power management controller 210, and, as a momentary switch, closes and opens in response to a user depressing and subsequently releasing the actuation mechanism 104. Repeated actuations will thus provide a pulsed DC signal from DC power 218 to a signal input of the power management controller 210. The second switch 206 closes simultaneously with the first switch 204 due to the actuation mechanism movement, but unlike the first switch 204 which opens when actuation movement has ended, the second switch 206 is magnetically latched closed by a permanent magnet in latch control assembly 208. While the second switch 206 remains closed, AC power is continuously supplied to the AC/DC converter 212 and is converted to DC power thereby providing DC power to the system. For clarity, DC power operating power is always applied to a power input of power management controller 210 whenever AC/DC converter 212 is operating, and there is DC power at node 218; but such power is separate from the described DC signaling function of switch 204.

The open/closed state of second switch 206 is regulated by latch control assembly 208 under control of power management controller 210 and transistor 216. Power management controller 210 is coupled through transistor 216 to latch control assembly 208. Power management controller 210 controls the release function of latch control assembly 208, and thereby controls release of the second switch 206, and thus the timing of achieving a zero-power off mode. In the example configuration, latch control assembly 208 includes a solenoid responsive to a DC current. In this example, since second switch 206 is held closed magnetically, the solenoid may be used to overcome the force of the permanent magnet (either through magnetic repulsion, or through movement of a mechanically interacting member, as known to those skilled in the art), and to thereby open second switch 206 when a magnetic field is generated by DC current passing through the solenoid, as pulsed by the power management controller 210.

Transition to a zero-power off mode will be made, in some cases, in response to a determined switch actuation movement. As will be apparent to those skilled in the art having the benefit of this disclosure, the entry into a power off mode (or other mode) can also occur through a software interface (such as selecting a command from a displayed menu). The actuation "movement," when used, can be a single movement, such as one closing of switch 204 for a predetermined period, or could be, for example, a series of closures (such as a double press of the push button) resulting in sending a pulse pattern to a signal input of power management controller 210. The determined switch actuation movement and resulting pulse signal(s) to the power management controller 210 instructs the controller to change power modes to a zero-power off mode. With the second switch 206 open, the system achieves true zero-power off mode by eliminating any power draw by the system. As will be apparent to those skilled in the art, additional components may be included within various specific implementations of the described system. For example, additional electrical components might be included for changing one or more pulse polarities, for impedance matching, for filtering, etc.

In some configurations, the power management controller 210 will differentiate between receiving a pulsed DC signal and a sustained DC signal, and potentially between various forms of pulsed signals. Thus, based on the type of received DC signal, the power management controller 210 can place the system in various soft power modes, or in the zero power off mode. For example, a sustained depressing of the actuation mechanism provides a sustained closure of the first switch 204, and thus a sustained DC signal received at a signal input of power management controller 210. Or, as noted earlier, sequences of button presses might be used for other operational control.

The timing diagram 200B of FIG. 2B illustrates operational states of components of circuit configuration 200A including the actuation mechanism 104, first and second switches 204 and 206, AC power signal, DC power signal, power on state (G0), and the solenoid and zero-power off states (G3). Initially, both the first switch 204 and second switch 206 are open. When a user depresses the actuation mechanism 230, causing movement, both switches 204 and 206 close 232A, 232B, and second switch 206 remains closed 234 by virtue of the latch control assembly 208. The closure of second switch 206 232B couples AC power source 214 to AC/DC converter 212. A small delay of $t_1$ 236 occurs between closure of second switch 206 and the output of DC power 238 by the AC/DC converter 212 due to delays inherent in the converter. An additional delay $t_2$ 240 occurs after DC power is delivered to the system before achieving power management controller 210 control 242 of the power on state, as shown in the timing diagram by the "run mode" 250 line. Upon receiving a subsequent appropriately-configured actuation movement (here, depicted as a single short duration press), the first switch 204 once more temporarily closes 244, providing a DC signal pulse 246 to the power management controller 210 to transition to a zero-power-off mode for the system. Immediately following the falling edge of the actuation motion (e.g., push button), the power management controller 210 ends G0 mode, which generates a solenoid control pulse 252, causing the solenoid to open 254 switch 206, and the system achieves a zero-power mode As can be seen in the diagram, at the rising edge of the solenoid control pulse 252, second switch 206 opens and both AC and DC signals are terminated simultaneously 256, 258, so no current can be drawn by the system.

Figure 3A:
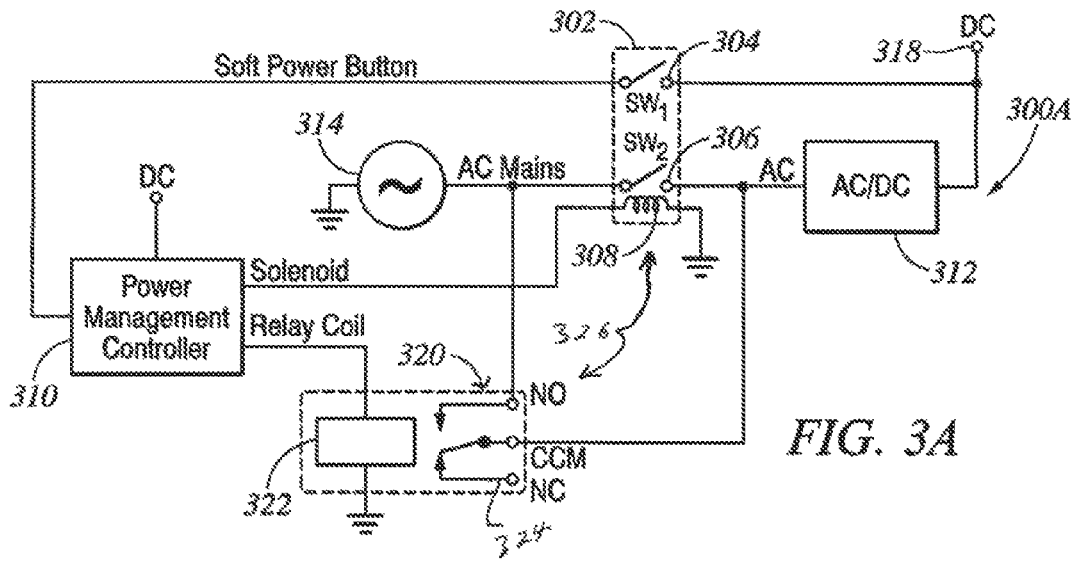
FIGS. 3A-B depict an alternative example circuit configuration and corresponding timing diagram of a slow-releasing power switch assembly providing two parallel AC power paths.
Figure 3B:
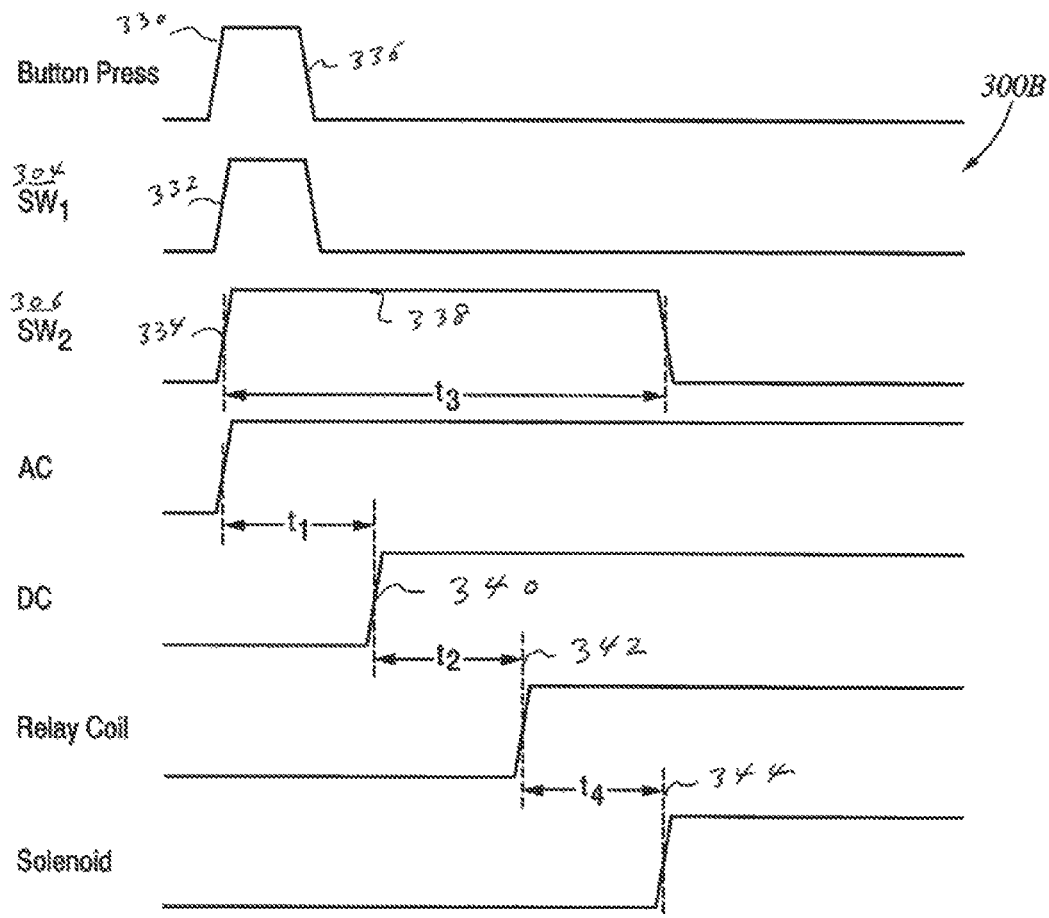

FIGS. 3A-B depict, in FIG. 3A an alternative example circuit configuration 300A including providing two parallel AC paths; and in FIG. 3B, corresponding timing diagram 300B. The first AC power path flows through a switch assembly 302, through switch 306, and is regulated by latch control assembly 308 in communication with power management controller 310. The second AC power path flows in a parallel path to the first and includes a relay 320 in communication with power management controller 310. In this example, relay 324 includes a single pole, double throw switch 324 responsive to relay coil 322.

Similar to the circuit of FIG. 2A above, circuit configuration 300A includes power switch assembly 302 coupled between an AC power source 314 and an AC/DC converter 312, where the DC power output 318 is coupled to a power input of power management controller 310, and is also coupled through power switch assembly 202 to a signal input to power management controller 310, as previously described. Power switch assembly 302 again includes two momentary mechanical switches; a first switch 304 placed between the power management controller 310 and DC power node 318, and a second switch 306 connecting AC power source 314 to AC/DC converter 312 when in a closed position. Second switch is, again, mechanically latched by latch control assembly 326, and held closed after movement of the actuation mechanism has ended, thus providing continuous AC power to the system. In this example, the latch control assembly includes a relay 320 and a solenoid 308. The latch control assembly 326, is again coupled to power management controller 310 and operates to release the second switch 306 under the control of the power management controller, as described in reference to FIG. 2A.

Relay switch 324 of the second AC power path includes a first normally open position ("NO") which connects the AC power source 314 to AC/DC converter 312 through the switch arm ("COM"), and a second normally closed position ("NC"), which is open. In operation, once switch 306 is closed, establishing the first AC path, at any time after the time delays from the AC/DC converter, and powering up the power management controller 310, the power management controller 310 will signal relay 320, energizing coil 322, and switching switch 320 from the "open" NC second position to the first NO position, thereby establishing the second, and parallel, AC path traveling from the AC power source 314 through switch 320 to the AC/DC converter 312. At that time, both the first AC power path through switch assembly 302 and the second AC power path through switch 320 are simultaneously operational. After an additional time delay, or at any desired time, power management controller 310 provides a pulse to latch control assembly 326 to energize the release mechanism (in this example, again, a solenoid 308), which opens the second switch 306, as discussed in reference to FIG. 2A above. Thus, with the second switch 306 open, the circuit configuration 300A provides AC power through the second AC path and without reliance on switch 306. In some examples, the latch control assembly solenoid 308 will be continuously powered by the power management controller 310, energizing the solenoid to prevent the second switch 306 from latching closed with subsequent actuation mechanism movements. With the second AC path under the control of the power management controller, a determined signal input through actuation of switch 304 will cause power management controller 310 to turn off power to relay 320, causing switch 324 to toggle from NO to NC, opening the second AC power path and achieving a zero-power off mode.

While the magnetic latching of the AC power switch (SW2) has been described for this example, and that of FIGS. 2A-B, other mechanisms are envisioned for providing latching of a switch in response to mechanical movement, but release under electronic control. For example, the switch could latch through physical, mechanical engagement, but be releasable in response to a solenoid, as described. Other configurations can also be contemplated utilizing electrical latching. For example, a dedicated AC/DC converter might be used that could provide a DC signal very quickly in response to provided AC power (such as within the duration of an anticipated button press), and that DC power might be used to electrically latch SW2 (or another AC switch) in a closed, conducting position.

As another alternative, a switch might be used for the AC power, that is not electrically releasable, but which self-releases after some minimum time period. Such "slow release" switches are known in a variety of configurations. Here, a slow release switch needs only to maintain the electrical connection for a few seconds (for example 3 to 7 seconds in most systems) until after the time that the AC/DC converter can power up, provide power to the power management circuit, and the circuit can control relay 320 to assume control of the AC path.

Additionally, in the depicted example, once the second power path through the relay switch 324 has been established, the first power path through second switch 306 is redundant, and can be released at any time. However, by utilizing the second switch 306 to provide power only during the relatively low power operations of powering the AC/DC converter until the power management controller can activate relay 320, second switch 306 can be a relatively low current capacity switch, and therefore one that be latched and released more easily that a much higher current capacity switch, as would be required for a switch carrying the operating power for the maximum load of full system operation.

Timing diagram 300B of FIG. 3B illustrates operational states of components of circuit configuration 300A. Initially, when the actuation mechanism is moved (e.g., a mechanical push-button is pressed) 330, first switch 304 and second switch 306 are simultaneously closed, 332, 334. When movement ceases 336 (e.g., push button is released), first switch 304 returns to an open state, and second switch 306 remains latched closed, coupling AC power to the system, and in particular to AC/DC converter 312, which (and after a time delay $t_1$) 340, begins providing DC power to the system 340. The power management controller 310 signals the relay coil 322, which, in turn, switches relay switch 324 from a NC position to a NO position, providing a second, parallel AC power path after a delay $t_2$ 342. With the AC power path though relay switch 312 established, switch 306 can be opened at any time desired, leaving the operational state of the system exclusively under the control of power management controller 310. Whenever that state is desired to occur (indicated by delay $t_4$), power management controller 310 signals the latch control assembly 308, and the solenoid opens the magnetically held second switch 306, thereby providing AC power to the system only through the second power path through relay switch 320.

Figure 4:
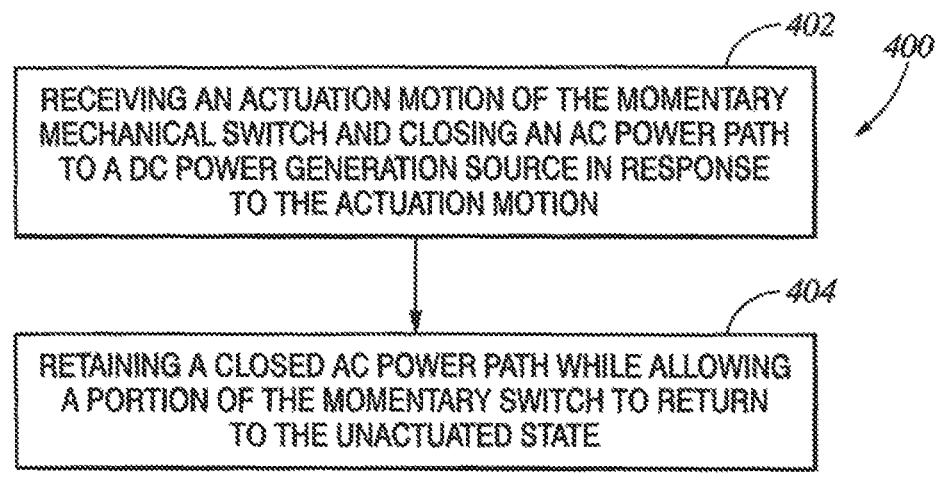
FIG. 4 illustrates a flow diagram of a method of controlling operation states of a processing system through use of a momentary mechanical switch.

FIG. 4 illustrates a method 400 of controlling operational states of a processing system through use of a momentary mechanical switch. At block 402, the method 400 begins by receiving an actuation motion of the momentary mechanical switch, and closing an AC power path to a DC power generation source in response to the actuation motion. The method 400 continues at block 404 where the method 400 retains a closed AC power path while allowing a portion of the momentary switch to return to the unactuated state. At block 404, the AC power path is maintained independently of power from the DC power generation source. In embodiments, the momentary mechanical switch may include first and second poles and the AC power path may be established through a first pole and the second pole may provide DC input signals when the AC power path is closed. In other embodiments, DC power generation source may include an AC to DC converter, and retention of the closed AC power path may be controlled at least in part by the power management controller.

Figure 5:
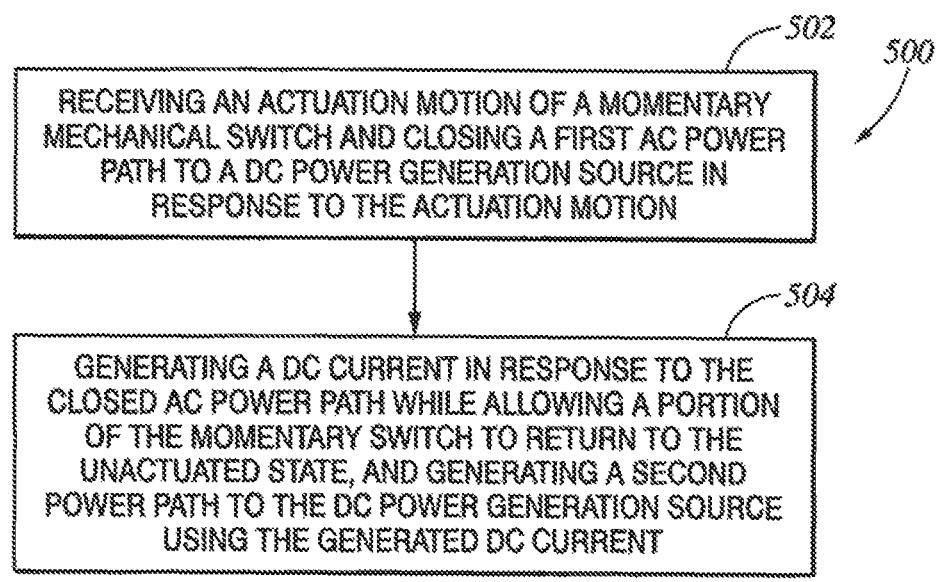
FIG. 5 illustrates a flow diagram of an alternative method of controlling operation states of a processing system through use of a momentary mechanical switch.

Similar to FIG. 4, FIG. 5 also illustrates a flow chart of an alternative method 500 of controlling the operational states of a processing system through use of a momentary mechanical switch. At block 502, the method 500 receives an actuation motion of the momentary mechanical switch, and closes a first AC power path to a DC power generation source in response to the actuation motion. At block 504, the method 500 generates a DC current in response to the closed AC power path while allowing a portion of the momentary switch to return to an unactuated state, and while generating a second AC power path to the DC power generation source through use of a generated DC current. In an embodiment, the second power path may be established by a relay actuated by the generated DC power. In other embodiments, the method may further includes the act of communicating DC power to a power management controller, and the power management controller functions to selectively maintain the second AC power path to the DC power generation source.

Various embodiments or combination of embodiments for apparatus and methods, as described herein, can be realized in hardware implementations, software implementations, and combinations of hardware and software implementations. Implementations including software will include a machine-readable medium having machine-executable instructions, such as a computer-readable medium having computer-executable instructions, for performing the described operations. The machine-readable medium is not limited to any one type of medium.

Although specific embodiments have been illustrated and described herein, it will be appreciated by those of ordinary skill in the art that any arrangement that is calculated to achieve the same or a similar purpose may be substituted for the specific embodiments shown. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description.

What is claimed is:

1. An electronic device, comprising:
   a first momentary switch configured to switch a control path between a DC output of an AC/DC power converter and a power management controller;
   a second momentary switch configured to switch a power path between an AC power source and the AC/DC power converter;
   wherein the first and the second momentary switches comprise a double-pole, single-throw assembly, wherein the first and second momentary switches are configured to simultaneously close in response to a first actuation motion of an actuation mechanism;
   wherein the second momentary switch additionally comprises,
      a magnet configured to retain the second momentary switch in a closed position after the second momentary switch receives the first actuation motion to maintain the power path between the AC/DC power source to the AC/DC power converter, and
      a solenoid operable to release the second momentary switch;
   wherein the power management controller is configured to,
      receive control signals from the first momentary switch through the control path, and
      selectively activate the solenoid to release the second momentary switch; and
   wherein the first momentary switch is configured to,
      receive a second actuation motion of the actuation mechanism, and
      in response to receiving the second actuation motion, transmit a control signal through the control path to the power management controller, causing the power management controller to activate the solenoid to release the second momentary switch, thereby opening the power path and eliminating essentially all current drain from the AC power source.

2. A method for controlling the operational states of a processing system through use of a mechanical double-pole single-throw switch, comprising the acts of:
   receiving a first actuation motion of the mechanical double-pole single-throw switch wherein the mechanical double-pole single-throw switch comprises a first momentary switch and a second momentary switch, wherein the first momentary switch is configured to switch a control path between a DC output of an AC/DC power converter and a power-management controller;

wherein the second momentary switch is configured to switch a power path between an AC power source and the AC/DC power converter;

wherein the first actuation motion of the double-pole single throw switch causes the first and second momentary switches to simultaneously close, causing the second momentary switch to close the power path between the AC power source to an AC/DC power converter;

using a magnet to retain the second momentary switch in a closed position; and receiving a second actuation motion of the mechanical double-pole single throw switch, thereby causing the first momentary switch to transmit a control signal through the control path to the power management controller;

wherein in response to control signal, the power management controller activates a solenoid to release the second momentary switch, thereby opening the power path and eliminating essentially all current drain from the AC power source.

3. The method of claim 2, wherein the power management controller is configured to, in response to receiving at least one control signal, cause the execution of instructions by at least one processor to perform operations in the processing system.

4. The method of claim 3, wherein the operations comprise changing the operational state of the processing system.

5. The processing system of claim 4, wherein the operations comprise changing the operational state of the processing system.

6. The processing system of claim 3, wherein the power management controller is configured to, in response to receiving at least one control signal, cause the execution of instructions by at least one processor to perform operations in the processing system.

7. A processing system operable from an AC/DC power source, comprising:
   at least one processor;
   a least one memory; and
   a first momentary switch configured to switch a control path between a DC output of an AC/DC power converter and a power-management controller;
   a second momentary switch configured to switch a power path between an AC power source and the AC/DC power converter;
   wherein the first and the second momentary switches comprise a double-pole, single-throw assembly, wherein the first and second momentary switches are configured to simultaneously close in response to a first actuation motion of an actuation mechanism;
   wherein the second momentary switch additionally comprises,
      a magnet configured to retain the second momentary switch in a closed position after the second momentary switch receives the first actuation motion to maintain the power path between the AC/DC power source to the AC/DC power converter, and
      a solenoid operable to release the second momentary switch;
   wherein the power-management controller is configured to,
      receive control signals from the first momentary switch through the control path, and
      selectively activate the solenoid to release the second momentary switch; and
   wherein the first momentary switch is configured to,
      receive a second actuation motion of the actuation mechanism, and
      in response to receiving the second actuation motion, transmit a control signal through the control path to the power-management controller, causing the power-management controller to activate the solenoid to release the second momentary switch, thereby opening the power path and eliminating essentially all current drain from the AC power source.

* * * * *